Patented Sept. 16, 1947

2,427,454

UNITED STATES PATENT OFFICE 2,427,454

CORUNDUM JEWEL

John Allen Heany, New Haven, Conn.

No Drawing. Application January 29, 1942,
Serial No. 428,671

15 Claims. (Cl. 106—42)

This invention relates to synthetic or artificial jewels and more particularly to a process for making corundum jewels, such as the ruby.

The corundum jewel, consisting of corundum with certain added compounds, possesses properties which make it highly useful in the various arts and sciences. Its hardness, for example, is nine (9) in the Mohs' scale, and hence the material has special utility as bearings for clocks, knife edge balance bearings, guides in the various textile arts, phonograph needles, micrometer tips, mortars and pestles, and many other uses, aside from its use for adornment in the form of ruby and sapphire.

The natural corundum jewel is crystalline and therefore difficult to work on account of its hardness. Also the crystal size is usually small, thus offering difficulty in forming for use. Moreover the supply of the natural corundum jewel is limited.

Synthetic corundum gem or jewel manufacture has been carried on for many years. The principal process was developed by Verneuil about 1902, utilizing an oxyhydrogen flame to fuse powdered alumina, the fused alumina being collected on a fire-clay support in a mass called a boule.

The Verneuil process is useful but has its limitations since the boule is irregular in shape, is formed under considerable internal strain and readily fractures, surface structure lines arising from the agglomeration method of making are present, gas bubbles readily form, and the boule splits in the direction of deepest color.

Among the objects of the present invention is to provide a process for making corundum jewels wherein no appreciable internal strain developes in the material during the manufacturing process.

Another object is to provide a process in which the corundum material may be cast in the form of the article and subsequently heat treated, thus avoiding appreciable modification after the final hardening step.

An object also is to provide a process of corundum jewel manufacture in which the material may be worked in a dough-like mass and extruded or otherwise formed while in a plastic state.

Objects also consist in the provision of a process for making corundum gems in which colors may be readily and uniformly applied at will; in which gas bubbles and pits are eliminated; in which a blank may be formed and machined prior to the hardening step; in which brittleness, internal strains, feather inclusions, structure lines and the like may be readily removed.

Other objects include the provision of a process permitting easy cutting and polishing and the elimination of cleaving.

An object of the invention also is to provide as a new article of manufacture a partially or fully crystalline, hard, dense, homogeneous, vitreous synthetic corundum, possessing a conchoidal fracture, and characterized by absence of fused areas.

Further objects will appear on consideration of the details to follow of preferred process steps of the invention and of the products resulting therefrom, it being understood that the description is illustrative and subject to modification within the scope of information available to those skilled in the art.

Corundum, chemically considered, is aluminum oxide or alumina $(Al_2O_3)$. The natural gem or jewel, which I term corundum jewel, contains certain impurities which seem to modify chemically the basic corundum to improve its value in the arts as well as produce the extraordinary color effects.

I have found that a combination of the following substances form a close duplicate of the natural corundum jewel: alumina, magnesia, iron oxide, silica, titanium oxide, and compounds of one or more of the color producing elements, chromium, cobalt and vanadium.

In carrying out one process of my invention I obtain the following ingredients which I measure out in the proportion by weight indicated:

| | Grams |
|---|---|
| Colloidal alumina | 980 |
| Colloidal silica | 12 |
| Magnesium hydroxide | 8 |
| Iron hydroxide | 1 |
| Titanium hydroxide | 1 |

It is noted that the materials mentioned are colloids or of a colloidal nature with particles of colloidal size, the term "colloid" being used in either sense in the specification and claims; also that the amounts of materials mentioned are merely to give the proportion of the ingredients in the mixture, the percentage of alumina being about 97.5%.

The materials are placed in a mixing or blending machine such as the oblique barrel type and are mechanically mixed until there results a complete blending of the different materials.

The mixed substance is then placed in a dough mixer or masticator having revolvable blades. The masticator is started in motion and then a mixture of 26.3 grams of chromic nitrate in 490 cc. of water is slowly added, producing a dough-like mixture.

After adequate treatment in the masticator, i. e., after a mixing operation of one-half hour or longer to produce a thoroughly dispersed and dough-like mixture, the mass is removed to an oven and heated at about 212° F. to dry the same. I find a water bath to be satisfactory in this drying operation.

The material is now treated in a rotary screen. For this purpose I employ a tubular screen of about 80 mesh wire. Porcelain balls are placed inside the screen cylinder and assist in breaking up the lumps of the mass and forcing the dried material through the screen mesh as a fine powder.

The material is now ready for forming and any desired shape may be obtained by the use of appropriate dies in which the powder is compressed. The pressure used will depend on the plasticity of the mass which in turn is dependent on the permissible tolerances of the article. In the case of articles usable with low tolerances it is desirable that the moisture content of the formed mass be low to reduce heat shrinkage. Forming with low moisture content requires relatively greater pressure, in some cases as high as eight tons per square inch. On the other hand, in the case of a putty like mass with no close tolerance requirements, as low as one hundred pounds, or less, pressure per square inch is usable.

The formed articles are then placed in a gas furnace or preferably in an electric heated vacuum furnace where the temperature is kept within a range of 1500° C. to 1800° C. or, at least, below the fusion point of the mixture by not less than 100° C. The furnace heat treatment is started at room temperature followed by a gradual temperature rise to about 1500° or above, at which temperature the heat is maintained for from about one to four hours, or preferably from two to three hours. At the end of the period the heat is turned off and the furnace cooled off slowly and gradually to room temperature. The furnace is then opened and the article removed.

On inspection and test it will be found that the final article is a dense, vitreous, homogeneous, tough material having a conchoidal fracture and a hardness of approximately nine (9) Mohs. Because of the special heat treatment there are no appreciable internal strains resulting in cracks, fissures, striations or other flaws. Due to the use of a maturing temperature and slow cooling a certain amount of crystal growth takes place, usually not in excess of twenty-five per cent of the mass. This imparts crystalline characteristics to the product but with the complete absence of internal strains such as result from fusion and subsequent crystallization with rapid cooling.

The absence of internal strain in the materials may be due to the fact that the crystals formed are exceedingly small and are developed below the fusion point of the material. Should the fusion point be exceeded the crystalline structure developing on cooling is under high internal strain such that a surface scratch may cause it to shatter. In my material the micro-crystalline or crypto-crystalline structure developes slowly in sub-fusion temperatures, thus acquiring marked toughness and freedom from strain.

Depending on the maximum furnace maturing temperature used I may obtain complete or partial crystallization. Where partial crystallization is desired the furnace temperature is slowly brought up to about 1530° C. where it is held for about two hours, the heat removed and the furnace permitted to drop to room temperature. Full crystallization generally requires a maximum temperature of at least between 1600° C. and 1700° C. followed by a three hour maturing period and a slow drop to room temperature. These three periods—the slow heating, the maturing and the slow cooling—all seem to be important in perfecting a satisfactory jewel.

The avoidance of fusion is secured apparently from two conditions. The first is that the particles of the constituent substances are of colloidal size, and hence generally under one micron in diameter. The alumina used is amorphous, and is essentially colloidal. It may be purchased in the open market or prepared by the direct ignition of pure ammonium alum in quartz dishes according to the formula $$Al_2(SO_4)_3(NH_4)_2SO_4 = 2NH_3 + H_2O + 4SO_3 + Al_2O_3$$

The colloidal alumina may also be prepared by the combustion of finely divided metal aluminum. Also the alumina may be prepared by igniting the precipitated hydroxide according to the formula $$2Al(OH)_3 = 3H_2O + Al_2O_3$$

Other methods consist in purifying bauxite by fusing the same with soda ash, resultant melt (sodium aluminate) being dissociated with hot water and aluminum hydroxide being precipitated by a stream of carbon dioxide gas.

Colloidal alumina is also produced by the action of carbon dioxide on sodium aluminate.

Colloidal silica powder is made by passing hydrochloric acid over metallic silicon heated to a nascent red heat. This forms silico-chloroform gas ($HSiCl_3$) which is combustible, and on ignition deposits colloidal silica on appropriate collecting surfaces.

The other materials are also of colloidal nature, and hence the mixture possesses minute particle size.

The second condition permitting the avoidance of fusion is the intimate mixture of the colloidal substances accompanied by high pressure agglomeration.

Intimate mixture is a natural consequence of the minute colloidal particle size and the use of liquid suspension and solution. Mixture under these conditions assures an almost complete dispersion and resultant homogeneity and when the mix is dried, compressed and heated vitrification takes place at unusual low temperatures.

Other factors such as a type of catalytic action due to the free chlorine or one or more of the mixed materials may also tend to assure sub-fusion vitrification, crystallization, and consolidation of the mass.

Modifications of the process as described may be made. For example, I may first make a mechanical mixture of the colloidal alumina and colloidal silica (alumina 980 grams, silica 12 grams) in an ordinary dry mixer or blender. This mixture is then placed in a masticator such as the Baker Perkins type, and the various other ingredients added as solutions. First is added of magnesium acetate, $Mg(C_2H_3O_2)_2 \cdot 4H_2O$, of an amount which will equal eight grams of the magnesium oxide in the finished product. Then if chromium oxide is the coloring matter I will add 26.3 grams of the chromic nitrate $Cr(NO_3)_3 \cdot 7\frac{1}{2}H_2O$ which is mixable with water and completely disseminable. This weight may be varied in accordance with the color depth desired, 26.3 grams giving a light red color.

I then pour into the masticator one gram of a solution of ferrous acetate ($Fe(C_2H_3O_2)_2 4H_2O$) followed by one gram of titanium tri-chloride ($Ti_2Cl_6$).

The masticator is then placed in motion and 490 cc. of water slowly added. The result is a dough-like mass of thoroughly mixed materials.

The mass is now placed in the oven and heated at around 212° F. until it is dry. Preferably the dried mass is then screened by an eighty mesh rotary screen as described with reference to the first outlined process. The screened powder is then placed in dies of appropriate form, compressed and heated to the 1500° C.–1800° C. range as previously described.

A third process modification utilizes as the silica ingredient a colloidal clay such as English china clay, the process being as follows:

To 968 grams of colloidal alumina is added 30 grams of colloidal clay (aluminum silicate). These materials are placed in a dry mixer as previously described and after intimate and thorough mixing moved into a masticator where solutions of compounds of magnesium, iron, titanium and a coloring matter in solution form, such as chromium, vanadium, cobalt, etc. After the masticator is placed in motion I slowly add 490 cc. of water to form a dough-like mass.

The process of the prior modifications follows, including drying, screening, forming and heating. An advantage of this process modification lies in the enhanced plasticity given the mix by the clay.

It is apparent that by the colloidal material processes above described I secure a uniform and complete distribution of the ingredients and coloring elements so that the resultant product has uniform coloring and is entirely homogeneous in structure. Also since the product by analysis gives the proportionate elements of the natural corundum gem it is apparent that I can synthetize corundum gems by these processes to produce a product having the hardness of the natural corundum but possessing superior homogeneity, greater susceptibility to formation into articles, and improved economy in the cost of production.

Analysis of my product reveals the presence of iron oxide, titanium dioxide, magnesium oxide, silicon dioxide, aluminum oxide, water, one or more of the following: chromium oxide, cobalt oxide, or vanadium oxide, depending on the color used. Titanium dioxide may appear as a trace but is usually completely volatilized, it apparently serving some purpose in the chemical changes of the processes. This parallels the composition of the natural ruby or sapphire.

Where it is desirable to secure a high polish on the product as in jewel bearings for watches, this may readily be accomplished by applying a vacuum to the product in the heating step. An electric furnace may be used with vacuum pump connections, and during the heating step the furnace pressure is reduced, thus freeing the heating mass of entrapped gases as formed and thus permitting the final crystallization to take place without the formation of pits or roughened areas. Subsequently by a lapping or metal tool method applying small grain diamonds or diamond dust, the articles are given a desired surface polish.

The utility of my product has been demonstrated in many uses. For example when utilized as a guide for nylon yarn, after four months of use no noticeable wear of the guide was apparent, whereas the ordinary porcelain guides in comparable use last usually not over a day. Automatic stamp processes can be applied to form articles from my material thus speeding up the comparatively slow methods now current in the manufacture of corundum gem articles from the natural or fused corundum.

Because of the powder-pressure-heat steps of the process the article may be formed prior to development of hardness, in distinction to prior methods of synthetizing corundum gems where the ingredients are melted and fused into a boule by an accretion process. Obviously a boule so formed is limited in size, is apt to have bubbles and pockets, possesses pronounced internal strain and because of its hardness can be worked only with great difficulty.

While I have specified certain materials as appropriate for use in the described processes, equivalent substances may also be used. For example, instead of magnesium acetate I may employ magnesium chloride, magnesium chromate or magnesium ammonium chromate. Also, for coloring I may use chromium compounds for red, cobalt compounds for blue, or mixtures of these compounds to secure modified colors. Or I may omit such coloring elements as chromium, cobalt, vanadium, etc., and by increasing the iron and titanium content produce a blue product. Also I may omit the drying and powdering steps, forming the article directed by extrusion or similar means, from the dough-like mixture.

Various other modifications will also be apparent.

I claim as my invention:

1. A process for making corundum jewels which comprises mixing substances in colloidal particle form including alumina, silica, magnesium hydroxide, iron hydroxide, and titanium hydroxide with water to form a dough-like mass, drying, powdering and forming the mass into article shape, heating the article to a temperature within the range of 1500° C. to 1800° C. and maintaining this temperature for a time period of about one to four hours.

2. A process of making corundum jewels which comprises mixing in colloidal form alumina, silica, magnesium hydroxide, iron hydroxide and titanium hydroxide with water to form a dough-like mass, forming said mass into article form and heating the article for a time period sufficient to develop a crypto-crystalline structure at a temperature above 1500° C. and below 1800° C.

3. A process of making corundum jewels which comprises mixing thoroughly in dry, colloidal form alumina, silica, magnesium hydroxide, iron hydroxide, and titanium hydroxide, masticating the dry mixture with water to form a dough-like mass, forming the mass into article shapes, slowly heating the formed articles to a temperature between 1500° C. and 1800° C., maintaining the temperature of the articles between 1500° C. and 1800° C. for between one and four hours, and then permitting the temperature to drop slowly to room temperature.

4. A process of making corundum jewels which comprises mixing thoroughly in dry, colloidal form alumina, silica, magnesium hydroxide, iron hydroxide, titanium hydroxide, masticating the dry mixture with water to form a dough-like mass, drying and powdering the mass, forming the powdered mass to article form, heating the articles to a temperature between 1500° C. and 1800° C., which temperature is maintained for a time period of approximately three hours, and thereafter permitting the temperature to drop slowly to room temperature.

5. A process of making corundum jewels which comprises mixing in dry colloidal form and in the proportions indicated, the following compounds:

| | Grams |
|---|---|
| Magnesium hydroxide | 8 |
| Iron hydroxide | 1 |
| Silica | 12 |
| Titanium hydroxide | 1 |
| Amorphous alumina | 980 | masticating said mixture with 26.3 grams of chromic nitrate in 490 cc. of water to form a dough-like mass, drying the mass at a temperature of about 212° F., powdering the dry mass forming the powder in dies into articles, heating the articles to a temperature range of 1500° C. to 1800° C. where the temperature is maintained for two to three hours followed by a slow reduction to room temperature.

6. A process of making corundum jewels which comprises making a dry mixture of amorphous silica and alumina having particles of colloidal size, adding to the dry mixture solutions of magnesium acetate, a ferrous acetate, and titanium tri-chloride and water, masticating the combined dry mixture and solutions into a dough-like mass, drying the mass, powdering the mass, forming the powder to articles, heating the articles for from one to four hours at a temperature between 1500° C. and 1800° C.

7. A process of making corundum jewels which comprises dry mixing amorphous alumina and silica of approximately colloidal particle form in the proportion of 980 grams alumina and 12 grams silica, adding to this mixture magnesium acetate of an amount giving 8 grams of magnesium oxide after heat reduction, one gram of a solution of a ferrous acetate, one gram of a solution of titanium tri-chloride, 494 cc. of water, masticating these substances to form a dough-like mass, drying the mass at a temperature preferably around 212° F., powdering the dry mass, forming the powder to articles, and heating the articles for two to three hours at a temperature ranging from 1500° C. to 1800° C.

8. A process of making corundum jewels which comprises dry mixing amorphous alumina and colloidal aluminum silicate clay, masticating the mixture with solutions of heat reductible oxide compounds of magnesium, iron, titanium and a coloring compound, and water to form a dough-like mass, drying and powdering the mass, forming the powder to article shapes, and finally heating for one to four hours at a temperature ranging from 1500° C. to 1800° C.

9. A process of making corundum jewels which comprises making a dry mixture of amorphous alumina and aluminum silicate clay having colloidal particle size in the proportions of alumina 968 grams and clay 30 grams, masticating the mixture with solutions of heat reducible oxide compounds of magnesium, iron, and titanium, of such amounts with 490 cc. of water as to produce a dough-like mass, drying and powdering the mass, pressing the powder into article form, and heating the article for from two to three hours at a temperature above 1500° C. and below 1800° C.

10. A process of making corundum jewels which comprises mixing oxide compounds of aluminum, silicon, magnesium, iron, and titanium in the colloidal state, with water, drying, powdering, forming, and heating to a temperature below the fusion point where a partial crystallization of the mass takes place, cooling and polishing.

11. A process of making corundum jewels which comprises mixing oxide compounds of aluminum, silicon, magnesium, iron, and titanium in the colloidal state, with water, drying, powdering, forming, and heating at sub-atmospheric pressure to a temperature above 1500° C. and below the fusion point, cooling and polishing.

12. A dense, hard crystalline, homogeneous, fired and unfused mass consisting of alumina, ferric oxide, magnesia and silica, said mass being formed of an amorphous alumina 980 parts, colloidal silica 12 parts, magnesia hydroxide 8 parts, iron hydroxide 1 part, and titanium hydroxide 1 part.

13. A dense, hard, homogeneous, fired and unfused mass formed of amorphous alumina 98.0 parts, colloidal silica 1.2 parts, magnesium hydroxide 0.8 part, iron hydroxide 0.1 part and titanium hydroxide 0.1 part.

14. A dense, hard, homogeneous, fired and unfused mass formed of amorphous alumina 98.0 parts, colloidal silica 1.2 parts, magnesium hydroxide 0.8 part, iron hydroxide 0.1 part and titanium hydroxide 0.1 part and possessing crystalline properties.

15. A synthetic corundum jewel formed of compounds giving alumina, iron oxide, titanium dioxide, magnesium oxide, and silicon dioxide, said forming compounds being in colloidal form and the alumina compound constituting about 97.5% of the whole.

JOHN ALLEN HEANY.

REFERENCES CITED

The following references are of record in the file of this patent:

UNITED STATES PATENTS

| Number | Name | Date |
|---|---|---|
| 1,567,445 | Lubowsky | Dec. 29, 1925 |
| 2,128,289 | Dubilier et al. | Aug. 30, 1938 |
| 1,004,505 | Verneuil | Sept. 26, 1911 |
| 1,935,717 | Jaeger et al. | Nov. 21, 1933 |
| 1,952,255 | Jaeger et al. | Mar. 27, 1934 |
| 1,952,256 | Jaeger et al. | Mar. 27, 1934 |
| 883,286 | Bushner | Mar. 31, 1908 |
| 1,373,854 | Berry | Apr. 5, 1921 |
| 2,310,953 | Heany | Feb. 16, 1943 |

FOREIGN PATENTS

| Number | Country | Date |
|---|---|---|
| 442,937 | France | 1912 |